US012738563B2

(12) United States Patent
Keum et al.

(10) Patent No.: US 12,738,563 B2
(45) Date of Patent: Sep. 15, 2026

(54) BATTERY DEVICE

(71) Applicant: LG ENERGY SOLUTION, LTD., Seoul (KR)

(72) Inventors: Jong Yoon Keum, Daejeon (KR); Jong Chul Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 671 days.

(21) Appl. No.: 18/025,359

(22) PCT Filed: Oct. 26, 2021

(86) PCT No.: PCT/KR2021/015101
§ 371 (c)(1),
(2) Date: Mar. 8, 2023

(87) PCT Pub. No.: WO2022/092764
PCT Pub. Date: May 5, 2022

(65) Prior Publication Data

US 2023/0335830 A1 Oct. 19, 2023

(30) Foreign Application Priority Data

Oct. 27, 2020 (KR) ........................ 10-2020-0140221

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/655* (2015.04); *H01M 10/6555* (2015.04);
(Continued)

(58) Field of Classification Search
CPC ........... H01M 10/6556; H01M 10/655; H01M 10/6555; H01M 10/6557; H01M 10/6563;
(Continued)

(56) References Cited

U.S. PATENT DOCUMENTS 10,122,054 B2 11/2018 Shen et al.
10,236,488 B2 3/2019 Li
(Continued)

FOREIGN PATENT DOCUMENTS

EP 2339598 A2 6/2011
JP 2009193881 A 8/2009
(Continued)

OTHER PUBLICATIONS

First Office Action issued Apr. 27, 2025 of Chinese Patent Application No. 202180057857.5 claiming priority to Korean Patent Application No. 10-2020-0140221. 1 (Note: US 20170256764 A1, US 2017271726 A1, US 2016235882 A1, US 2018351222 A1, KR 10-2016-0062878 A were cited in prior IDS.).
(Continued)

*Primary Examiner* — Eugenia Wang
(74) *Attorney, Agent, or Firm* — Morgan, Lewis & Bockius LLP

(57) ABSTRACT

Provided is a battery apparatus. The battery apparatus includes a plurality of battery cells, a housing configured to accommodate the plurality of battery cells, a heat sink having a refrigerant passage therein to cool the battery cells inside the housing, and a moisture absorbent adjacent to the heat sink to absorb moisture.

19 Claims, 4 Drawing Sheets

(51) Int. Cl.

| | |
|---|---|
| ***H01M 10/655*** | (2014.01) |
| ***H01M 10/6555*** | (2014.01) |
| ***H01M 10/6557*** | (2014.01) |
| ***H01M 10/6563*** | (2014.01) |
| ***H01M 10/6567*** | (2014.01) |
| ***H01M 10/6568*** | (2014.01) |
| ***H01M 50/204*** | (2021.01) |
| ***H01M 50/213*** | (2021.01) |
| ***H01M 50/24*** | (2021.01) |
| *H01M 10/643* | (2014.01) |

(52) U.S. Cl.
CPC ... *H01M 10/6557* (2015.04); *H01M 10/6563* (2015.04); *H01M 10/6567* (2015.04); *H01M 10/6568* (2015.04); *H01M 50/204* (2021.01); *H01M 50/213* (2021.01); *H01M 50/24* (2021.01); *H01M 10/613* (2015.04); *H01M 10/643* (2015.04)

(58) Field of Classification Search
CPC ......... H01M 10/6567; H01M 10/6568; H01M 10/613; H01M 10/643; H01M 10/625; H01M 10/647; H01M 10/6554; H01M 10/6569; H01M 10/6551; H01M 50/204; H01M 50/213; H01M 50/24; H01M 50/20; H01M 50/209; Y02E 60/10
See application file for complete search history.

(56) References Cited

U.S. PATENT DOCUMENTS

| | | | |
|---|---|---|---|
| 2011/0155224 | A1 | 6/2011 | Yang et al. |
| 2013/0164576 | A1 | 6/2013 | Cha et al. |
| 2014/0134469 | A1 | 5/2014 | Dämon et al. |
| 2016/0235882 | A1 | 8/2016 | Noh et al. |
| 2017/0256764 | A1 | 9/2017 | Li |
| 2017/0271726 | A1 | 9/2017 | Shen et al. |
| 2018/0123195 | A1 | 5/2018 | Fees et al. |
| 2018/0151930 | A1 | 5/2018 | Kim et al. |
| 2018/0351222 | A1 | 12/2018 | Min |
| 2019/0036181 | A1 | 1/2019 | Tokozakura et al. |
| 2019/0280255 | A1 | 9/2019 | Lee et al. |
| 2022/0158273 | A1 | 5/2022 | Razack |

FOREIGN PATENT DOCUMENTS

| | | | |
|---|---|---|---|
| JP | 2013-134993 | A | 7/2013 |
| JP | 5880847 | B2 | 3/2016 |
| JP | 2017-509757 | A | 4/2017 |
| JP | 2017157542 | A | 9/2017 |
| JP | 2018-106982 | A | 7/2018 |
| JP | 2018-535528 | A | 11/2018 |
| JP | 2019-170546 | A | 10/2019 |
| KR | 10-2008-0053717 | A | 6/2008 |
| KR | 10-2014-0077272 | A | 6/2014 |
| KR | 10-2015-0069320 | A | 6/2015 |
| KR | 10-2016-0062878 | A | 6/2016 |
| KR | 10-2018-0004990 | A | 1/2018 |
| KR | 10-2018-0088278 | A | 8/2018 |
| KR | 10-2073332 | B2 | 2/2020 |
| WO | 2020/197982 | A1 | 10/2020 |

OTHER PUBLICATIONS

Extended European Search Report issued Mar. 7, 2024 for European Patent Application No. 21886758.8 (Note: US 2018/0351222 A1, KR 10-2015-0069320 A & KR 10-2016-0062878 A were cited in a prior IDS.).

Office Action issued May 13, 2024 for Japanese Patent Application No. 2023-515358 (Note: JP 2017-157542 A was cited in a prior IDS.).

International Search Report (with partial translation) and Written Opinion dated Feb. 4, 2022, issued in corresponding International Patent Application No. PCT/KR2021/015101.

First Office Action of Taiwanese Patent Application No. 110139637 dated Dec. 3, 2024. (Notes: CN105683281B cited therein corresponds to US2016/0235882, which is already of record. US2014/0134469 cited therein is already of record.).

Jia Hongbing et al., Nanjing University Press, Gaofenzi Cailiao ("Polymer Materials"), p. 93.—See additionally attached concise statement of relevance.

Cen Yanqiang et al., Wuhan University of Technology Press, Kuangnei Rehuanjing Gongcheng ("Mine Thermal Environment Engineering"), p. 253.—See additionally attached concise statement of relevance.

Feng Naiqian, China Machine Press, Jianming Xiandai Jianzhu Cailiao Shouce ("Concise Modern Building Materials Handbook"), p. 382.—See additionally attached concise statement of relevance.

Decision of Rejection dated Mar. 18, 2026 issued in the corresponding Chinese Patent Application No. 202180057857.5.

BATTERY DEVICE

BACKGROUND

The present disclosure relates to a battery apparatus, and more particularly, to a battery apparatus, in which a battery cell is capable of being prevented from being damaged due to leakage of a refrigerant of the battery apparatus including a heat sink.

A secondary battery, which is chargeable and dischargeable, that is, a battery, is widely used as an energy source for mobile devices such as smartphones. In addition, the battery is being also used as energy sources for electric vehicles, hybrid electric vehicles, etc., which are suggested as measures for solving air pollution caused by gasoline and diesel vehicles using fossil fuels.

The types of applications using batteries are being diversified due to the advantages of batteries, and it is expected that batteries will be applied to more fields and products in the future than now.

A battery has a structure in which a plurality of battery modules including a plurality of unit cells are connected in series and/or in parallel to obtain a high output. In addition, each of the unit cells includes positive and negative collectors, a separator, an active material, an electrolyte, and the like so as to be repeatedly chargeable and dischargeable by electrochemical reaction between the components.

In the medium-to-large batteries, it is very important to dissipate heat generated from each battery cell because a large number of battery modules are manufactured in a form in which a plurality of battery modules are densely packed in a narrow space. In addition, since a process of charging or discharging the battery is performed by the electrochemical reaction, the battery is affected by ambient temperature conditions. For example, if the charging/discharging process is carried out in a state in which the battery is exposed to adverse temperature conditions such as cryogenic or extremely high temperature, in which the optimum temperature is not maintained, charging/discharging efficiency of the battery may be deteriorated, and as a result, it may be difficult to secure performance for a normal operation. Particularly, since lithium-ion secondary batteries may be ignited or exploded when being exposed to high-temperature environments for a long time, the related industries are focusing on development of medium-to-large battery packs with high output capacity and excellent cooling efficiency.

Therefore, it is necessary to dissipate the heat generated in the battery module. One of various methods for this is a method for cooling the battery module using a heat sink through which a refrigerant flows therein. Such a battery module may include, for example, a plurality of battery cells, a housing in which the plurality of battery cells are accommodated, and a heat sink which is provided at one side of the housing and through which a refrigerant flows.

However, when the refrigerant flowing to the heat sink leaks, the refrigerant may be penetrated into the battery module, that is, into the housing. To prevent this, the inside of the housing is filled with a resin, and accordingly, the battery cells inside the housing are wrapped with the resin. That is, the resin is filled into the housing to have a structure in which the battery cell is submerged by the resin.

However, in this typical method, since the entire battery module needs to be filled with the resin, there are difficulties in the process, such as an increase in cost due to the filling of the resin, and the need to fill the resin with a uniform thickness.

PRIOR ART DOCUMENT

Patent Document (Patent Document 1) Korean Patent Publication No. 10-2014-0077272

SUMMARY

The present disclosure provides a battery apparatus, in which a battery cell is capable of being prevented from being damaged due to leakage of a refrigerant of the battery apparatus including a heat sink.

The present disclosure provides a battery apparatus, in which a refrigerant leaking from a heat sink is absorbed to prevent a batter cell from being damaged by an inflow of the refrigerant.

In accordance with an exemplary embodiment, a battery apparatus including: a plurality of battery cells; a housing configured to accommodate the plurality of battery cells; a heat sink provided with a refrigerant passage to cool the battery cells inside the housing; and a moisture absorbent provided to be adjacent to the heat sink so as to absorb moisture.

The heat sink may be provided to be in contact with the housing.

The heat sink may include a refrigerant inlet, through which a refrigerant is introduced into the refrigerant passage, and a refrigerant outlet, through which the refrigerant is discharged from the refrigerant passage.

The moisture absorbent may be provided in at least one region in which the refrigerant of the heat sink flows.

The moisture absorbent may be provided at at least one of a connection portion of the inlet, a connection portion of the outlet, a connection portion between the inlet and a refrigerant supply pipe, a connection portion between the outlet and a refrigerant supply pipe, or a bent portion of the heat sink.

In accordance with another exemplary embodiment, at least two housings are disposed to be adjacent to each other in a horizontal direction, wherein the inlets and the outlets of the adjacent heat sinks are connected to each other.

The moisture absorbent may be provided between the adjacent heat sinks.

The moisture absorbent may be provided at connection portions of the adjacent two heat sinks.

The moisture absorbent may absorb moisture and hold the absorbed moisture.

The moisture absorbent may be prepared using a super absorbent resin.

The moisture absorbent may include a super absorbent resin and aluminum hydroxide.

The aluminum hydroxide may be contained in an amount of approximately 0.5 parts by weight to approximately 5 parts by weight based on 100 parts by weight of the super absorbent resin.

The moisture absorbent may be composed of any one or more resins of polyacrylamide, polyacrylic acid, polymethacrylic acid, polyethylene oxide, polyvinyl alcohol, gelatin, polysaccharide, cellulose, and chitosan.

The moisture absorbent may include silica gel or calcium chloride and a resin provided to cover silica gel or calcium chloride.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
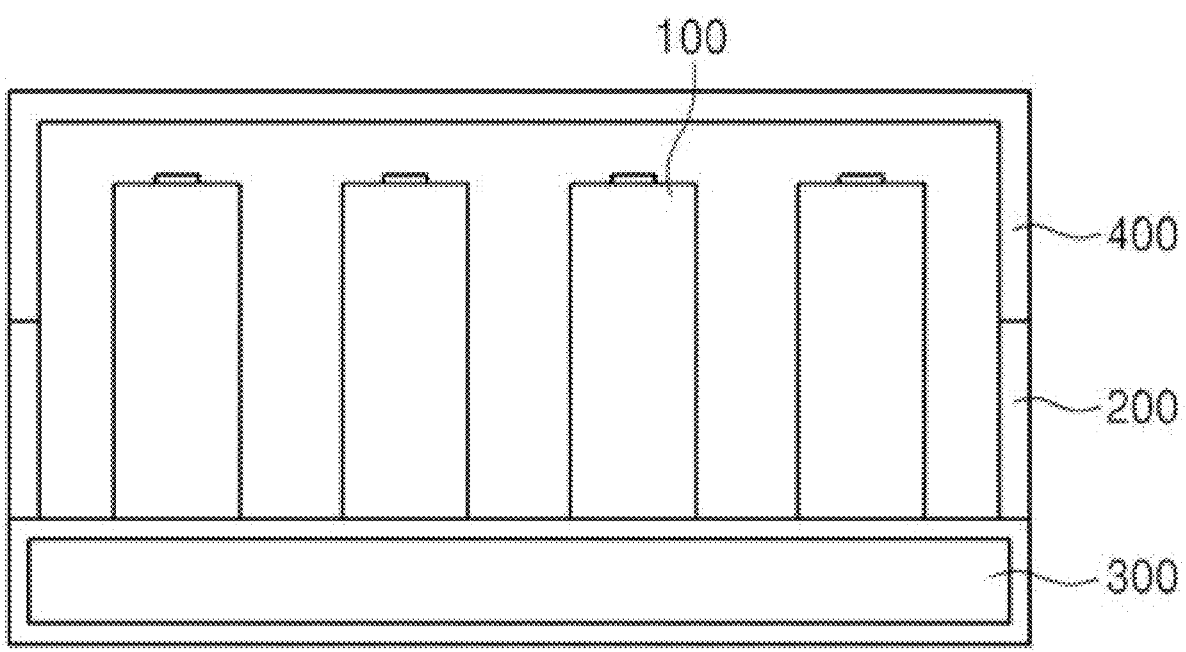
FIGS. 1 and 2 are schematic cross-sectional and exploded perspective views illustrating one battery module of a battery apparatus in accordance with an exemplary embodiment.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout.

Figure 2:
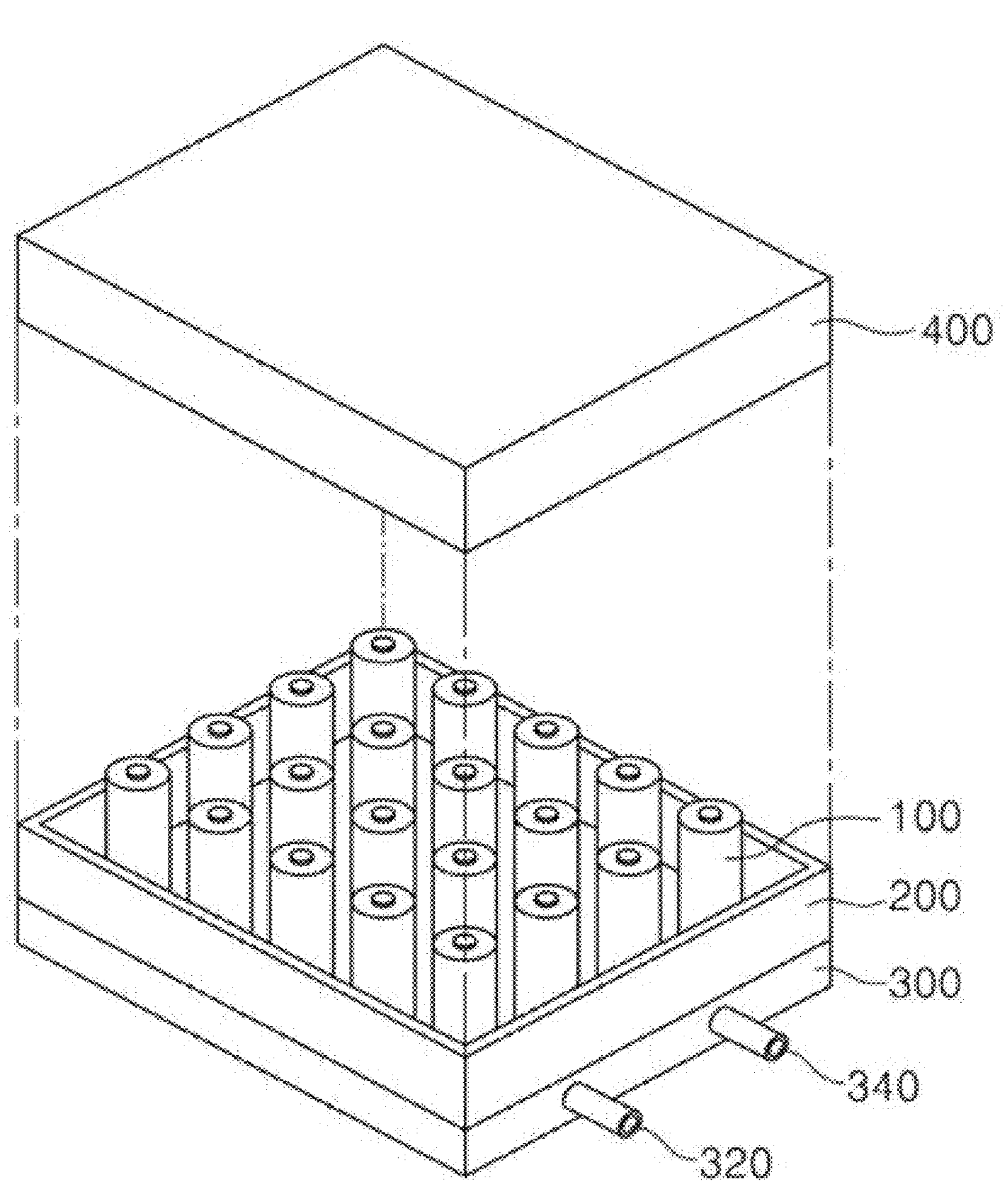
Figure 3:
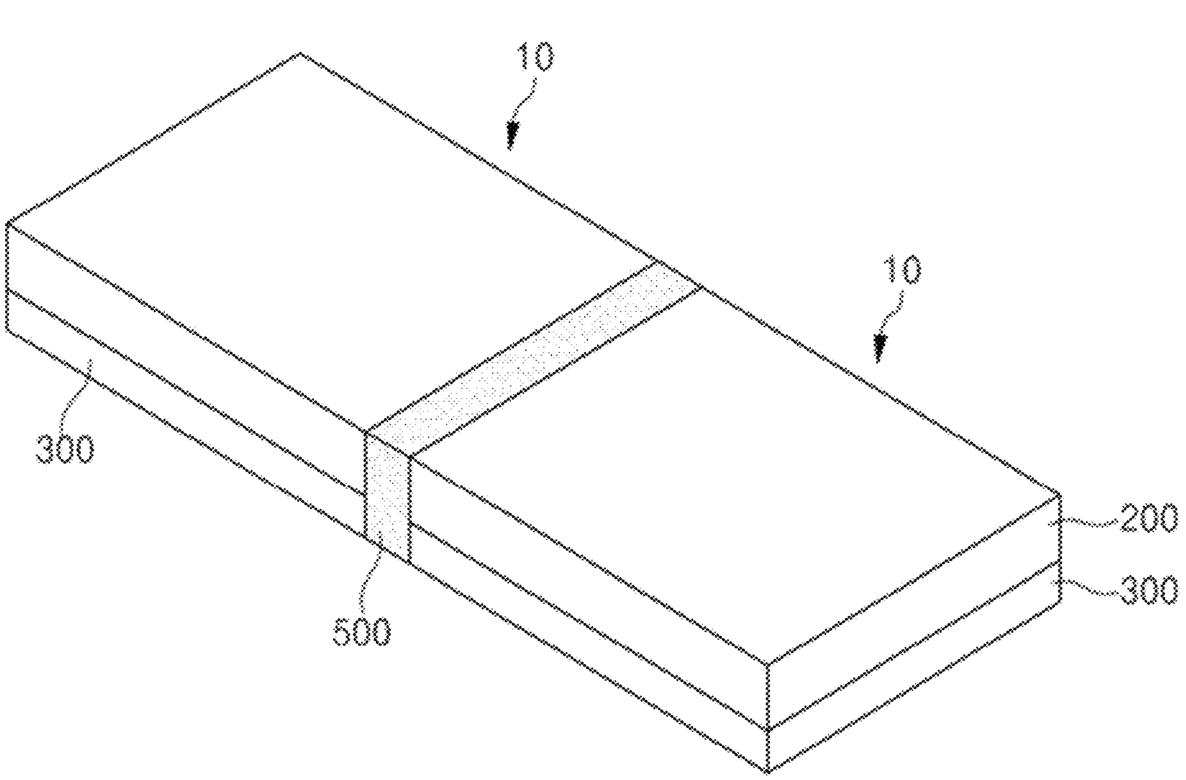
FIGS. 3 and 4 are cross-sectional and perspective views of a battery apparatus in which at least two battery modules are coupled in accordance with an exemplary embodiment.
Figure 4:
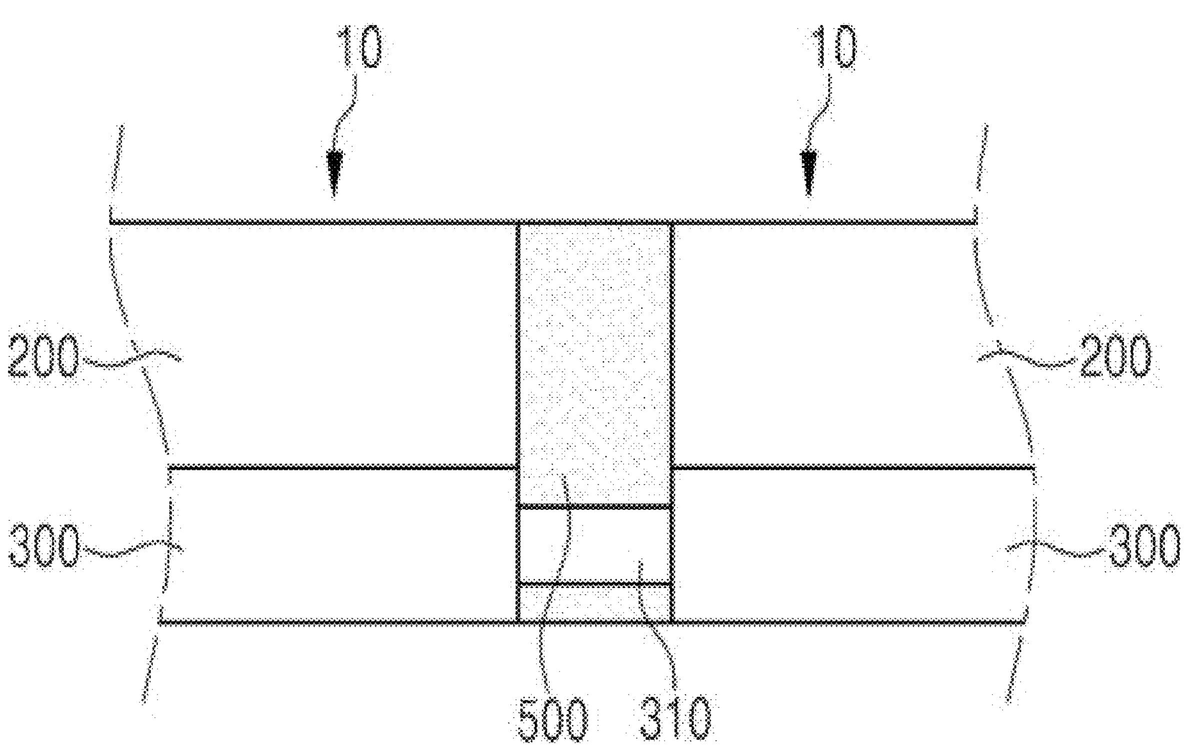

FIGS. 1 and 2 are schematic perspective and cross-sectional views of a battery module in accordance with an exemplary embodiment. Also, FIGS. 3 and 4 are perspective and cross-sectional views of a battery apparatus in which at least two battery modules are coupled in accordance with an exemplary embodiment.

Referring to FIGS. 1 to 4, a battery module 10 in accordance with an exemplary embodiment includes a plurality of battery cells 100, a housing 200 providing an accommodation space for accommodating the plurality of battery cells 100, a heat sink 300 provided with a refrigerant passage to cool the battery cell 100 accommodated in the housing 200, and a cover 400 provided to cover the housing 200 so as to provide the accommodation space inside the housing 200. In addition, the battery apparatus in accordance with an exemplary embodiment includes two or more battery modules 10 coupled thereto, and a moisture absorbent 500 capable of absorbing moisture by a refrigerant that may leak from the heat sink 300.

The plurality of battery cells 100 may be can-type battery cells. Here, each of the can-type battery cells 100 may be a secondary battery in which an electrode assembly is embedded in a metal can, and may include a cylindrical battery cell and a prismatic battery cell depending on a shape of the metal can. In this embodiment, the cylindrical battery cell 100 may be provided. However, the present disclosure is not limited to the cylindrical battery cell, and various forms such as the prismatic battery cell may be possible Although not shown, the cylindrical battery cell may include a cylindrical can, a jelly-roll type electrode assembly accommodated inside the can, and a cap assembly coupled to an upper portion of the can. Here, the cylindrical can may be made of a lightweight conductive metal material such as aluminum, stainless steel, or an alloy thereof. The can-type battery cells 100 may be connected in series and/or in parallel in accordance with an output and capacity required for the battery module 10. Although not shown, the can-type battery cells 100 may be electrically connected to each other by a bus bar made of a copper plate.

The housing 200 may be a structure that provides the accommodation space capable of accommodating the plurality of battery cells 100. The housing 200 has a substantially flat bottom surface and a side surface having a predetermined height from the bottom surface to accommodate the plurality of battery cells 100. Here, the height of the housing 200, that is, the height of the side surface of the housing 200 may be equal to or less than that of the battery cell 100. That is, the housing 200 may be coupled to the cover 400, which is provided to cover an upper side of the housing 200, to provide the accommodation space therein, and a top surface of the battery cell 100 in the accommodation space may be spaced a predetermined distance from an inner surface of the cover 400. Accordingly, the height of the housing 200 may vary depending on a shape of the housing 200 and a shape of the cover 400, but may be less than that of the battery cell 100. In addition, the housing 200 may be made of a metal material having excellent thermal conductivity to absorb heat of the battery cell 100. Although not shown, an upper end of the housing 200 may be bent to be provided horizontally with respect to the ground. The housing 200 may be coupled to the cover 400 having a lower end surface facing the bent upper end surface. In this case, the upper end surface of the housing 200 and the lower end surface of the cover 400 may be welded to each other. As another embodiment, an O-ring may be disposed on the upper end surface of the housing 200 and the lower end surface of the cover 400, and then, the upper end surface of the housing 200 to the lower end surface of the cover 400 may be coupled to each other by using a bolt. The plurality of battery cells 100 may be protected from the outside by shielding an inner space through the coupling of the housing 200 and the cover 400.

The heat sink 300 may absorb heat from the housing 200 through thermal contact by allowing the refrigerant to pass through the internal passage and thus may indirectly cool the plurality of battery cells 100. The heat sink 300 may be provided to be in contact with the bottom surface of the housing 200. In addition, the heat sink 300 may have a predetermined space therein, and a passage through which the refrigerant flows may be provided in the inner space. That is, the heat sink 300 is provided in a substantially hexahedral shape having the inner space, and the heat sink 300 may have the same length and width as the housing 200. Of course, the length and width of the heat sink 300 may be greater or less than the length and width of the housing 200. However, in consideration of the coupling of the battery module 10 and the like, the length and width of the heat sink 300 may be the same as the length and width of the housing 200. In addition, the height of the heat sink 300 may be less than the height of the housing 200. Although the passage inside the heat sink 300 is not shown, the passage may be provided in a predetermined tubular shape having a plurality of curved shapes. The refrigerant introduced from the outside may flow through the passage inside the heat sink 300, and the refrigerant flowing through the heat sink 300 may be discharged to the outside. That is, in the heat sink 300, the refrigerant may be introduced from the outside to flow along the passage and then be discharged to the outside after absorbing the heat while flowing along the passage. The refrigerant flowing through the passage of the heat sink 300 may use a fluid having excellent cooling property while easily flowing along the passage. For example, the refrigerant may be water that has high latent heat to maximize cooling efficiency. However, this embodiment is not limited thereto, and various refrigerants such as antifreeze, a gas refrigerant, air, and the like may be applied as long as a flow occurs along the passage. The heat sink 300 may be made of aluminum or an aluminum alloy having high thermal conductivity. Of course, this embodiment is not limited thereto, and the heat sink 300 may be made of a metal such as copper, gold, or silver, or a ceramic material such as aluminum nitride or silicon carbide. In addition, the heat sink 300 may be provided with at least one inlet 340 for introducing the refrigerant from the outside and at least one outlet 340 for discharging the refrigerant flowing through the passage to the outside. The inlet 320 and the outlet 340 may be respectively connected to the inlet 320 and the outlet 340 of the heat sink 300 of another adjacent battery module 10, and in the case of the outermost battery module 10, the inlet 320 and the outlet 340 of the heat sink 300 may be respectively connected to an external device, that is, an external refrigerant supply pipe and a refrigerant discharge pipe. On the other hand, although this embodiment has been described by showing an example in which the heat sink 300 is provided at a lower side of the housing 200, the heat sink 300 may be provided at at least one side of the housing 200 and be provided to wrap the housing 200. That is, the heat sink 300 may be provided to be in contact with the bottom surface of the housing 200, at least one of the two side surfaces of the housing 200, and the cover 400 and may be provided to wrap the bottom surface and the two side surfaces of the housing 200 and the cover 400.

As illustrated in FIG. 3, at least two or more battery packs 10 provided with the plurality of battery cells 100, the housing 200, and the heat sink 300 may be connected to each other. In this case, at least two or more battery packs 10 may be connected to the inlet 320 and the outlet 340 of the heat sink 300. For example, in the battery pack 10, the inlet 320 and the outlet 340, which are disposed at one side of the heat sink 300, may protrude (hereinafter, referred to as protrusions), and the inlet 320 and the outlet 340, which are disposed at the other side, have insertion portions into which the protrusions inserted. That is, each of the protrusions of the heat sink 300 of one battery pack 10 may be inserted into each of the insertion portions of the heat sink 300 of the other battery pack 10. Since the protrusion is inserted into the insertion portion as described above, the two or more battery packs 10 may be horizontally connected to each other through the heat sink 300. Of course, two or more adjacent battery packs 10 may be coupled and connected to each other in various forms other than the protrusion and the insertion portion. For example, the inlet 320 and the outlet 340 may be provided to protrude from one side and the other side of the battery pack 10, respectively, and then, the protruding portions may be connected to each other to connect the battery packs 10 to each other.

However, the refrigerant may leak from the connection portion of the heat sink 300, that is, the connection portions of the inlets 320 and the outlets 340, and the leaking refrigerant may be introduced into the battery cell 100 accommodated inside the housing 200, and thus, the battery cell 100 may be electrolyzed to generate hydrogen. In order to absorb the refrigerant leaking from the connection portion of the heat sink 300, the moisture absorbent 500 may be provided at the portion at which the refrigerant leaks, that is, the connection portion of heat sink 300. That is, as illustrated in FIG. 3, the moisture absorbent 500 may be provided at a predetermined height at the connection portion of the two adjacent heat sinks 300, that is, the portion at which the inlets 320 and the outlets 340 of the two adjacent heat sinks 300 are connected to each other. In an exemplary embodiment, the moisture absorbent 500 may be provided between the two adjacent battery packs 10. In this case, a predetermined space may be provided in a region in which the moisture absorbent 500 is disposed. For example, an accommodation part (not shown) may be provided at a predetermined length from the side surface of the battery module 10 in a longitudinal direction of the battery module 10 to which at least two battery modules 10 are coupled face to face, and the moisture absorbent 500 may be provided inside the accommodation part. The accommodation part may be provided to have a predetermined length in a direction of the battery module 10 adjacent from the bottom surface and both side surfaces of the battery module 10. That is, the accommodation part may have a side surface extending in the longitudinal direction from the bottom surface of the heat sink 300 and then extending upward by a predetermined height therefrom. Accordingly, the accommodation part may have a shape which has a side surface having a predetermined height with respect to the bottom surface, and an exposed top surface. In this case, the accommodation part may have a length, which corresponds to the length of the connection portion of the two adjacent heat sinks 300, that is, the connection portion of the inlet 320 and the outlet 340, and a height greater than that of the connection portion. Accordingly, since the moisture absorbent 500 is provided, the connection portion of the heat sink 300 may be filled with the moisture absorbent 500. The moisture absorbent 500 may be provided at a height at which at least the connection portion of the connection portion of the heat sink 300 is covered. For example, the height of the moisture absorbent 500 may correspond to the height of the heat sink 300. The height of the moisture absorbent 500 may be determined in accordance with to the height of the accommodation part. That is, the height of the accommodation part between the two adjacent battery modules 10 may correspond to the height of the moisture absorbing material 500 to be formed.

The moisture absorbent 500 in accordance with an exemplary embodiment may be made of a material capable of absorbing moisture and holding the absorbed moisture. As such a material, the moisture absorbent 500 may be made of a super absorbent polymer (SAP). The super absorbent polymer is a synthetic polymer material that has the ability to absorb moisture of approximately 500 times to approximately 1,000 times its own weight. The super absorbent polymer has excellent initial absorbency and also has excellent absorbency because almost no moisture comes out under a pressure even after a long period of time has elapsed The super absorbent polymer may be prepared by various methods. An example of the preparing method of the super absorbent polymer is presented in Korean Patent Registration No. 10-1719352 as a patent of the applicant of the present disclosure and briefly described as follows. First, an appropriate amount of acrylic acid, polyethylene glycol diacrylate as a crosslinking agent, caustic soda (NaOH), and water are mixed to prepare a monomer aqueous solution having a monomer aqueous solution composition ratio. Thereafter, the monomer aqueous solution is mixed with an ascorbic acid solution and a sodium persulfate solution, and then, polymerization is performed continuously with a hydrogen peroxide solution to prepare a hydrogel polymer. Then, the hydrogel polymer is dried, and the dried hydrogel polymer is pulverized. Then, a base polymer may be obtained by classifying a polymer having a grain size (average grain size) of less than approximately 150 μm and a polymer having a grain size of approximately 150 μm to approximately 850 μm using a sieve.

In addition, the moisture absorbent 500 includes a super absorbent polymer and aluminum hydroxide, and the aluminum hydroxide may be attached to a surface of the super absorbent polymer. That aluminum hydroxide is attached to the surface of the super absorbent polymer means that at least approximately 70% by weight or at least approximately 90% by weight of the aluminum hydroxide particles contained in the super absorbent polymer composition are fixed to the surface of the super absorbent polymer particles, and thus, aluminum hydroxide is not being physically separated from the super absorbent resin particles. In order to attach aluminum hydroxide to the surface of the super absorbent polymer, approximately 0.5 wt % of 8 μm aluminum hydroxide is dry-mixed with the base polymer, and then a surface treatment solution containing 1.3-propanediol is sprayed to treat the surface of the super absorbent polymer. In addition, in the process of the surface treatment, the classified hydrogel polymer is supplied to one surface cross-linking reactor, and the surface crosslinking reaction of the hydrogel polymer is performed at a temperature of approximately 180° C. or higher for approximately 40 minutes.

Since aluminum hydroxide has an insoluble feature and is dispersed and fixed on the surface of the super absorbent polymer, it may prevent the super absorbent polymer from being aggregated with each other to improve liquid permeability. Also, since the average grain size is large, a degree of coating of the surface is relatively small, and thus, deterioration in absorption capacity under the pressure may be minimized. The average grain size of aluminum hydroxide may be approximately 2 μm to approximately 50 μm, preferably approximately 5 μm to approximately 40 μm, and more preferably approximately 7 μm to approximately 20 μm. The aluminum hydroxide particles may have an average grain size of approximately 5 μm or more in terms of minimizing the deterioration in the absorbency under the pressure (AUP). In addition, the aluminum hydroxide particles may have an average grain size of approximately 50 μm or less in order to adhere well to the super absorbent surface, thereby giving an effect of increasing in fine powder content. Aluminum hydroxide may also be contained in an amount of approximately 0.5 parts by weight to approximately 5 parts by weight based on 100 parts by weight of the super absorbent resin.

In addition, the moisture absorbent 500 may be made of a resin that is capable of easily absorbing moisture. More specifically, the moisture absorbent 500 is made of a material that is capable of absorbing and holding moisture. The moisture absorbent 500 may be configured in any shape as long as the moisture absorbent 500 is a resin capable of rapidly absorbing moisture. For example, the moisture absorbent 500 may be composed of any one or more resins of polyacrylamide, polyacrylic acid, polymethacrylic acid, polyethylene oxide, polyvinyl alcohol, gelatin, polysaccharide, cellulose, and chitosan. The resin composed of polyacrylamide, polyacrylic acid, polymethacrylic acid, polyethylene oxide, polyvinyl alcohol, gelatin, polysaccharide, cellulose, and chitosan may be said to be a hydrophilic resin having very excellent bonding strength with water molecules.

In addition, the moisture absorbent 500 may have a plurality of pores therein. That is, the moisture absorbent 500 may be made of a material having a porosity. The porous moisture absorbent 500 may be prepared by various methods. For example, a method of foam-molding a material having porosity may be used. Thus, the porous moisture absorbent 500 may have pores defined with a fine size in the surface and inside thereof. Here, the pore of the moisture absorbent 500 may be formed with a porosity of approximately 1% to approximately 95%. The pore may be formed in a size of approximately 1 μm to approximately 1,000 μm. Here, the size of the pore may be the shortest diameter or the longest diameter and may be an average diameter. Among them, the shortest diameter may be approximately 1 μm to approximately 50 μm. For example, the pore may be formed in a size of approximately 1 μm to approximately 1,000 μm may be formed in a size of approximately 1 μm to approximately 500 μm or may be formed in a size of approximately 1 μm to approximately 100 μm. That is, the size of the pores may be variously changed in accordance with to the thickness and width of the moisture absorbent 500. In addition, the pores may be formed in the same size or different sizes. For example, a first pore having an average size of approximately 1 μm to approximately 300 μm, a second pore having an average size of approximately 300 μm to approximately 600 μm, and a third pore having an average size of approximately 600 μm to approximately 1,000 μm are mixed to prepare the moisture absorbent. In this case, the first to third pores may also have a plurality of sizes. That is, each of the first to third pores may have an average size and may have a plurality of sizes within each average size. Since the pores having the plurality of sizes in this way are used, small pores may be formed between the large pores, and thus the porosity may be further improved.

The moisture absorbent 500 may contain a polymer compound containing silica gel or calcium chloride. Silica gel, calcium chloride, etc. may be mixed with a predetermined resin to prepare the moisture absorbent 500. Here, silica gel, calcium chloride, etc. may be evenly mixed with the resin and evenly distributed in the moisture absorbent 500. However, silica gel, calcium chloride, etc. may be disposed at the lower side of the moisture absorbent 500, and thus a resin may be provided to cover silica gel, calcium chloride, etc. That is, the silica gel may be distributed at the height corresponding to the height the connection portion of the heat sink 300, through which the refrigerant leaks, or a height higher than the height of the connection portion of the heat sink 300, and a resin may be provided to cover silica gel and the like. Here, the resin may use a material having adhesive properties to improve bonding force of the battery module 10. For example, an epoxy resin or a silicone resin having adhesive strength may be used.

In the above embodiment, the configuration, in which the moisture absorbent 500 is provided at the connection portion of the heat sink 300, and the connection portion corresponds to each of the inlet 320 and the outlet 340 of the adjacent two battery modules 10, is described as an example. However, the moisture absorbent 500 may be provided at the connection portion between the inlet 320 and the refrigerant supply pipe and at the connection portion between the outlet 340 and the refrigerant discharge pipe. In addition, the moisture absorbent 500 may also be provided at the bent portion. That is, the moisture absorbent 500 may be provided at at least a portion of the heat sink 300, through which the refrigerant flows, such as the connection portions of the inlets 320 and the outlets 340, the connection portion with the cooling pipe, and the bent portion of the heat sink 300.

As described above, in this embodiment, the moisture absorbent 500 may be provided at the bonding portion of at least two or more battery modules 10. That is, the moisture absorbent 500 may be provided at at least a portion of the heat sink 300, through which the refrigerant flows, such as the coupled portion of the inlet 320 and the outlet 340 and the bent portion of the heat sink 300. Here, the moisture absorbent 500 may be provided at the height of at least the heat sink 300 so as to cover the coupled portions of the inlet 320 and the outlet 340. Of course, the moisture absorbent 500 may be provided to surround the coupled portions. The moisture absorbent 500 may be made of a material that contains a super absorbent resin to absorb and hold the refrigerant discharged from the heat sink 300. Since the moisture absorbent 500 is provided in this way, it is possible to absorb the refrigerant discharged from the heat sink 300, thereby preventing the refrigerant from being introduced into the housing 200, and as a result, preventing the battery cell 100 from being damaged. In addition, since it is not necessary to fill the inside of the typical housing 200 the resin, the limitations such as the increase in production cost may be solved.

The moisture absorbent may be provided at the coupled portions of the at least two or more battery modules. That is, the moisture absorbent may be provided at at least a portion of the heat sink through which the refrigerant flows, such as the coupled portions of the refrigerant inlet and outlet of the heat sink, the coupled portion with the refrigerant pipe, and the bent portion. In this case, the moisture absorbent may be made of a material that contains the super absorbent resin to absorb and hold the refrigerant leaking from the heat sink.

As described above, the battery apparatus in accordance with the present disclosure may be provided with the moisture absorbent to absorb the refrigerant leaking from the heat sink, thereby preventing the refrigerant from being introduced into the housing and preventing the battery cell from being damaged. In addition, since it is not necessary to fill the inside of the typical housing using the resin, the limitations such as the increase in production cost may be solved.

As described above, the technical idea of the present invention has been specifically described with respect to the above embodiments, but it should be noted that the foregoing embodiments are provided only for illustration while not limiting the present invention. Various embodiments may be provided to allow those skilled in the art to understand the scope of the preset invention, but the present invention is not limited thereto.

What is claimed is:

1. An apparatus, comprising:
- a first battery apparatus;
- a second battery apparatus adjacent to the first battery apparatus; and
- a moisture absorbent,
- wherein each of the first and second battery apparatuses comprises:
- a plurality of battery cells;
- a housing configured to accommodate the plurality of battery cells; and
- a heat sink having a refrigerant passage therein to cool the battery cells inside the housing,
- wherein the moisture absorbent is adjacent to the heat sink of at least one of the first and second battery apparatuses to absorb moisture, and
- wherein a protrusion of the heat sink of the first battery apparatus is inserted into an insertion portion of the heat sink of the second battery apparatus so that the heat sinks of the first and second battery apparatuses abut each other.

2. The apparatus of claim 1, wherein the heat sink of each of the first and second battery apparatuses is in contact with the housing of a respective one of the first and second battery apparatuses.

3. The apparatus of claim 2, wherein the heat sink of each of the first and second battery apparatuses comprises a refrigerant inlet, through which a refrigerant is introduced into the refrigerant passage, and a refrigerant outlet, through which the refrigerant is discharged from the refrigerant passage.

4. The apparatus of claim 3, wherein the moisture absorbent is in at least one region in which the refrigerant of the heat sink of the at least one of the first and second battery apparatuses flows.

5. The apparatus of claim 4, wherein the moisture absorbent is provided at at least one of a connection portion of the refrigerant inlet of the first battery apparatus, a connection portion of the refrigerant outlet of the first battery apparatus, a connection portion between the refrigerant inlet of the second battery apparatus and a refrigerant supply pipe, a connection portion between the refrigerant outlet of the second battery apparatus and a refrigerant discharge pipe, or a bent portion of the heat sink of the first or second battery apparatus.

6. The apparatus of claim 1, wherein the first and second battery apparatuses are adjacent to each other in a horizontal direction, and
- wherein refrigerant inlets and refrigerant outlets of the heat sinks of the first and second battery apparatuses are connected to each other.

7. The apparatus of claim 6, wherein the moisture absorbent is between the heat sinks of the first and second battery apparatuses.

8. The apparatus of claim 7, wherein the moisture absorbent is provided at connection portions of the refrigerant inlets and the refrigerant outlets of the heat sinks of the first and second battery apparatuses through which the heat sinks of the first and second battery apparatuses are connected to each other.

9. The apparatus of claim 1, wherein the moisture absorbent absorbs moisture and holds the absorbed moisture.

10. The apparatus of claim 9, wherein the moisture absorbent is prepared using a super absorbent resin.

11. The apparatus of claim 10, wherein the moisture absorbent comprises the super absorbent resin and aluminum hydroxide.

12. The apparatus of claim 11, wherein the aluminum hydroxide is contained in an amount of approximately 0.5 parts by weight to approximately 5 parts by weight based on 100 parts by weight of the super absorbent resin.

13. The apparatus of claim 9, wherein the moisture absorbent is composed of any one or more resins of polyacrylamide, polyacrylic acid, polymethacrylic acid, polyethylene oxide, polyvinyl alcohol, gelatin, polysaccharide, cellulose, and chitosan.

14. The apparatus of claim 9, wherein the moisture absorbent comprises silica gel or calcium chloride and a resin provided to cover silica gel or calcium chloride.

15. The apparatus of claim 1, wherein each of the protrusion and the insertion portion is a refrigerant inlet or a refrigerant outlet.

16. The apparatus of claim 1, wherein the moisture absorbent is disposed on an outer side surface of the heat sink of the at least one of the first and second battery apparatuses.

17. The apparatus of claim 1, wherein the moisture absorbent is disposed on an outer side surface of the heat sink of the at least one of the first and second battery apparatuses and on an outer side surface of the housing of the at least one of the first and second battery apparatuses.

18. The apparatus of claim 1, wherein the housing of each of the first and second battery apparatuses is located above the heat sink of a respective one of the first and second battery apparatuses, and
- wherein side surfaces of the housing of each of the first and second battery apparatuses does not face side surfaces of the heat sink of a corresponding one of the first and second battery apparatuses.

19. The apparatus of claim 1, wherein a resin does not fill an interior of the housing of each of the first and second battery apparatuses.

* * * * *